3,672,909
METHOD OF DENSIFYING FOOD PRODUCTS
Robert E. Berry, Owen W. Bissett, and Charles J. Wagner, Jr., Winter Haven, and Eldridge P. Patterson, Lakeland, Fla., assignors to the United States of America as represented by the Secretary of Agriculture
No Drawing. Continuation of application Ser. No. 670,803, Sept. 26, 1967. This application Sept. 30, 1970, Ser. No. 76,967
Int. Cl. A23l 1/10
U.S. Cl. 99—1
6 Claims

ABSTRACT OF THE DISCLOSURE

This invention relates to a method whereby powders of a porous nature which have a very low density and a very high bulk can be converted to powders of a higher density and lower bulk. More particularly, this invention relates to a method whereby a dry porous powder of a low bulk density is ground to a given particle size range and then fed into the nip of hard steel rolls where it is subjected to high pressures and where after such compression it is formed into flakes having from 3 to 4 times the bulk density of the original material.

---

This is a continuation of Ser. No. 670,803, filed Sept. 26, 1967.

A non-exclusive, irrevocable, royalty-free license in the invention herein described throughout the world for all purposes of the United States Government, with the power to grant sublicenses for such purposes, is hereby granted to the Government of the United States of America.

An object of this invention is to convert powders of a porous nature which have a very low density and a very high bulk into powders of a higher density and lower bulk. A further object of this invention is to increase bulk density of porous powders through the application of pressure alone and thus avoid the disadvantages of the "hot rolling" technique.

There are many processes which are used for the production of foodstuffs in dehydrated form. A great number of these result in a very porous dehydrated product with low density. Vacuum foam drying and foam mat drying are based upon the conversion of the product to foam before removal of moisture from it. Freeze drying sometimes uses materials in a foam and often results in dehydrated materials of a very porous nature. The products from these dehydration processes often have bulk densities so low that large volumes are required for preparation of adequate amounts for normal consumption. For example, an entire glassful of dehydrated juice powder may be required to provide sufficient material for reconstitution to a full glass of juice. It would be much more practical and convenient from the standpoint of consumer use if such products could be converted to a form whereby small, easily measured amounts, such as a spoonfull, could be used for measuring out average servings.

One method has been devised for accomplishing this conversion to a material of higher density. This method involves heating the material to a temperature above the fusion range and compressing the fused material between heated drums. This method accomplishes the desired increase in density but has several inherent disadvantages: (1) It is only applicable to materials which have a very high sugar content or materials which have a clear and distinct fusion range. (2) It requires the material to be heated to very high temperatures, often as high as 200° F., which is hot enough to bring about detrimental flavor changes in many types of delicate, heat sensitive, foods. (3) It requires that some kind of grease, lubricant, or other release agent be used to remove the fused material from the heated rolls after densification.

By nature, the materials which are most useful as release agents are relatively water insoluble. Thus, the product becomes impregnated and coated with a very thin film of water insoluble material. This in turn impedes wetting and therefore reconstitution of the juice, or food product, when water is added for conversion to the proper form for consumption. This has been confirmed by solubility tests where it has been shown that a much longer time is required for reconstitution of materials after densification by the "hot-rolling" technique than is required for comparable reconstitution prior to densification.

The present invention makes it possible to increase bulk density of porous powders through the application of pressure alone. This invention avoids the disadvantages of the "hot-rolling" technique. In the present invention, no heat is added, the product does not become sticky, and no release agent is necesnary.

This invention relates to a method whereby a dry porous powder of a low bulk density is ground to a given particle size range, fed into the nip of hard steel rolls where it is subjected to high pressure and after such compression, formed into flakes having from 3 to 4 times the bulk density of the original material. The densified material may then be converted to a powder with particle sizes in the range of 40 to 60 mesh, if rapid solubility is desired. This conversion to the proper particle size is especially applicable to materials which have a high sugar content and are to be reconstituted in cold water.

An apparatus for carrying out the instant invention is disclosed in Pat. No. 3,223,026. In this apparatus, two hard steel rolls 9 inches in diameter and 8 inches long are mounted in a heavy steel framework. The rolls are then connected to a suitable drive to provide a speed of around 16.3 r.p.m. The rolls are arranged with a large stud bolt at one end pressing on the bearing blocks through which the pressure between the rolls could be adjusted by tightening the bolt. The opposite side of the bearing blocks pressed against two large heavy leaf springs. The pressure between the rolls could be determined by measuring the force applied to the stud bolts by using a torque wrench. The stud bolts are tightened to provide a pressure of about 20,000 to 140,000 p.s.i. at each bearing.

The rolls for applying pressure can be arranged such that the rolls are mounted side by side and the powder fed into the nip from above or they can be mounted one above the other with the power fed from the side, or they can be mounted in an intermediate position between these extremes. The process can be made continuous by providing a feed belt to feed powder into the rolls and a continuous vibrating screen to sieve flakes after being scraped from the rolls with the very fine powder being recycled into the densifier. The densified flakes are fed into a grinder for conversion to a powder.

This process is not limited to materials with high sugar content. This process is also applicable to materials which may not ahve a narrow fusion range, such as starches, rice, potatoes, whenever a more dense and less porous powder is desirable. In this respect, it is different from the "hot-rolling" technique which requires heat and the application of a release agent and also that the materials to be densified have a very narrow melting or fusing temperature range.

It is obvious to those skilled in the art that during a long period of steady operations, roll temperatures will rise. Temperatures of 5° to 90° F. are not unusual but temperatures of 100° F. and above may be detrimental and should be avoided. If such temperatures are encountered and are significant, it would be a comparatively easy matter to pass cooling water through the center of the rolls.

EXAMPLE 1

Orange powder scraped from trays during foam-mat drying of orange juice was ground and sieved to a particle size range of 246 to 417 microns (U.S. mesh size 40 to 60). This powder had a bulk density of of 0.24 g./ml. The powder was fed uniformly, at room temperature, into the nip of the rolls at the middle 3 inches. After passing through the rolls the powder was converted into small flat flakes which were removed from the rolls by a steel doctor blade without the use of any external or internal release agents or lubricants. The flakes could be removed cleanly and completely and the rolls could be continued in use indefinitely without need for the application of any kind of lubricant or release agent. The flakes produced by this process were then passed through a roller grinder and sieved to a particle size range of 246 to 417 microns (U.S. mesh size 40 to 60). This powder had a bulk density of 0.84 g./ml. The original undensified powder was dispersed in cold water and was found to clump and float and was very unsightly during reconstitution. It required longer than two minutes to dissolve 34 g. of the original undensified powder in 100 ml. of water at 40° F. A sample of the same powder after the densification treatment sank to the bottom during reconstitution under the same conditions, did not clump, and dissolved in 45 seconds.

EXAMPLE 2

A grapefruit powder was prepared by foam mat drying grapefruit juice. The powder was scraped from the drying trays and ground to a particle size of 246 to 417 microns (U.S. mesh size 40 to 60). The powder had a bulk density of 0.13 g./ml. When 13 g. of the powder was added to 128 ml. of water at 40° F., it required 100 seconds for reconstitution. The same powder after densification through the pressure rollers, grinding, and sieving to an equivalent particle size, had a bulk density of 0.6 g./ml. The densified powder dissolved in 37 seconds, sank to the bottom during reconstitution and was more pleasing in appearance during reconstitution.

EXAMPLE 3

A sample of corn starch with a density of 0.53 g./ml was passed through the densifier rolls. The flakes were ground and the material was found to have a density of 0.75 g./ml. The original powder floated when added to water and was difficult to disperse. The densified powder dispersed readily and sank to the bottom during dispersion making it more pleasing in appearance.

EXAMPLE 4

Similar results were obtained with wheat flour as were obtained with corn starch except the density was only increased from 0.53 g./ml. to 0.62 g./ml. Again the densified material dispersed more readily and was more pleasing in appearance.

From the above examples, it is evident that this process is particularly applicable to dehydrated powder materials of a porous nature, especially those which require the addition of water for reconstitution prior to normal usage. This includes certain types of materials produced by foam-mat drying, foam-spray drying, freeze-drying, vacuum foam-drying, agglomerations and others. It is especially useful for reducing the tendency for a given material to float or clump during reconstitution and when used in conjunction with grinding and particle sizing to the optimum point, results in improved ease of reconstitution and shortened reconstitution time.

We claim:
1. A method of increasing the density and decreasing the bulk of a dry, porous, powdered foodstuff, comprising:
 (a) passing a dry, porous, powdered foodstuff having a particle size of about from 246 to 417 microns and a bulk density of about from 0.13 g./ml. to 0.53 g./ml. through pressure rollers at a roll temperature of about from 5° F. to 90° F. and at a roll pressure of about from 20,000 p.s.i. to 140,000 p.s.i. to convert the foodstuff into flakes having about from 3 to 4 times the bulk density of the original material, and
 (b) grinding the resulting densified material into a powder having a particle size of about from 246 to 417 microns and a bulk density of about from 3 to 4 times the bulk density of the original material.
2. The process of claim 1 wherein the foodstuff is selected from the group consisting of orange powder, grapefruit powder, corn starch powder, and wheat flour.
3. The process of claim 2 wherein the foodstuff is orange powder.
4. The process of claim 2 wherein the foodstuff is grapefruit powder.
5. The process of claim 2 wherein the foodstuff is corn starch powder.
6. The process of claim 2 wherein the foodstuff is wheat flour.

References Cited

UNITED STATES PATENTS

| 2,396,561 | 3/1946 | Flosdorf | 99—206 |
| 2,400,292 | 5/1946 | Dalton | 99—Dig. 4 |
| 3,223,026 | 12/1965 | Flemmings | 100—90 |
| 3,251,695 | 5/1966 | Gidlow | 99—94 |
| 3,365,298 | 1/1968 | Bouthilet | 99—206 |
| 3,511,666 | 5/1970 | Hudson | 99—66 |
| 3,527,647 | 9/1970 | Hager | 99—93 |

OTHER REFERENCES

Chem. Engineering Progress, vol. 60, No. 5, May 1964, p. 63.

NORMAN YUDKOFF, Primary Examiner

M. G. MULLEN, Assistant Examiner

U.S. Cl. X.R.

99—93, 104